US007665553B2

(12) United States Patent
Tabe

(10) Patent No.: US 7,665,553 B2
(45) Date of Patent: Feb. 23, 2010

(54) RENEWABLE ENERGY SYSTEM FOR ELECTRIC VEHICLES

(76) Inventor: Joseph Akwo Tabe, 11700 Old Columbia Pike, Suite 717, Silver Spring, MD (US) 20904

( * ) Notice: Subject to any disclaimer, the term of this patent is extended or adjusted under 35 U.S.C. 154(b) by 13 days.

(21) Appl. No.: 11/788,092

(22) Filed: Apr. 19, 2007

(65) Prior Publication Data
US 2008/0257614 A1 Oct. 23, 2008

(51) Int. Cl.
*B60K 1/00* (2006.01)
(52) U.S. Cl. .................. 180/2.2; 180/2.1; 180/65.1; 180/65.5
(58) Field of Classification Search .................. 180/2.1, 180/2.2, 65.1, 65.51
See application file for complete search history.

(56) References Cited

U.S. PATENT DOCUMENTS

| 3,556,239 | A | * | 1/1971 | Spahn | 180/65.2 |
| 3,878,913 | A | * | 4/1975 | Lionts et al. | 180/2.2 |
| 6,880,844 | B2 | * | 4/2005 | Hayes | 280/213 |
| 7,514,803 | B2 | * | 4/2009 | Wilks | 290/1 A |
| 2002/0153178 | A1 | * | 10/2002 | Limonius | 180/2.2 |
| 2007/0039764 | A1 | * | 2/2007 | McBryde | 180/2.2 |
| 2008/0169133 | A1 | * | 7/2008 | Tomoyasu | 180/2.2 |

* cited by examiner

*Primary Examiner*—S. Joseph Morano
*Assistant Examiner*—Katy Meyer

(57) ABSTRACT

Renewable Energy Advanced Device Solution is at least wind powered and comprises at least a motor, a battery cell, a clutch means, a generator armature, a communication means configured with a capacitance means and operatively connected to an accelerator pedal. The communication means is configured for directing the flow of energy from the capacitance means to the battery cell means and from the battery cell means to the motor. The motor of the vehicle is configured with harnesses communicatively connecting the generator armature with the capacitance means, the capacitance means with the communication means, and the communication means with the battery cell means responsive for supplying electrical energy to the motor and other electrical appliances for the vehicle. The communication means transfers electrical energy to kinetic energy that propels the vehicle and comprises means to connect the motor to enable the flow of electricity. The motor is configured with regenerative braking means responsive for conservation of energy by means of transferring the kinetic energy back to electrical energy when pressure on the accelerator pedal is released to enable the conversion energy to initially slow down vehicle.

17 Claims, 11 Drawing Sheets

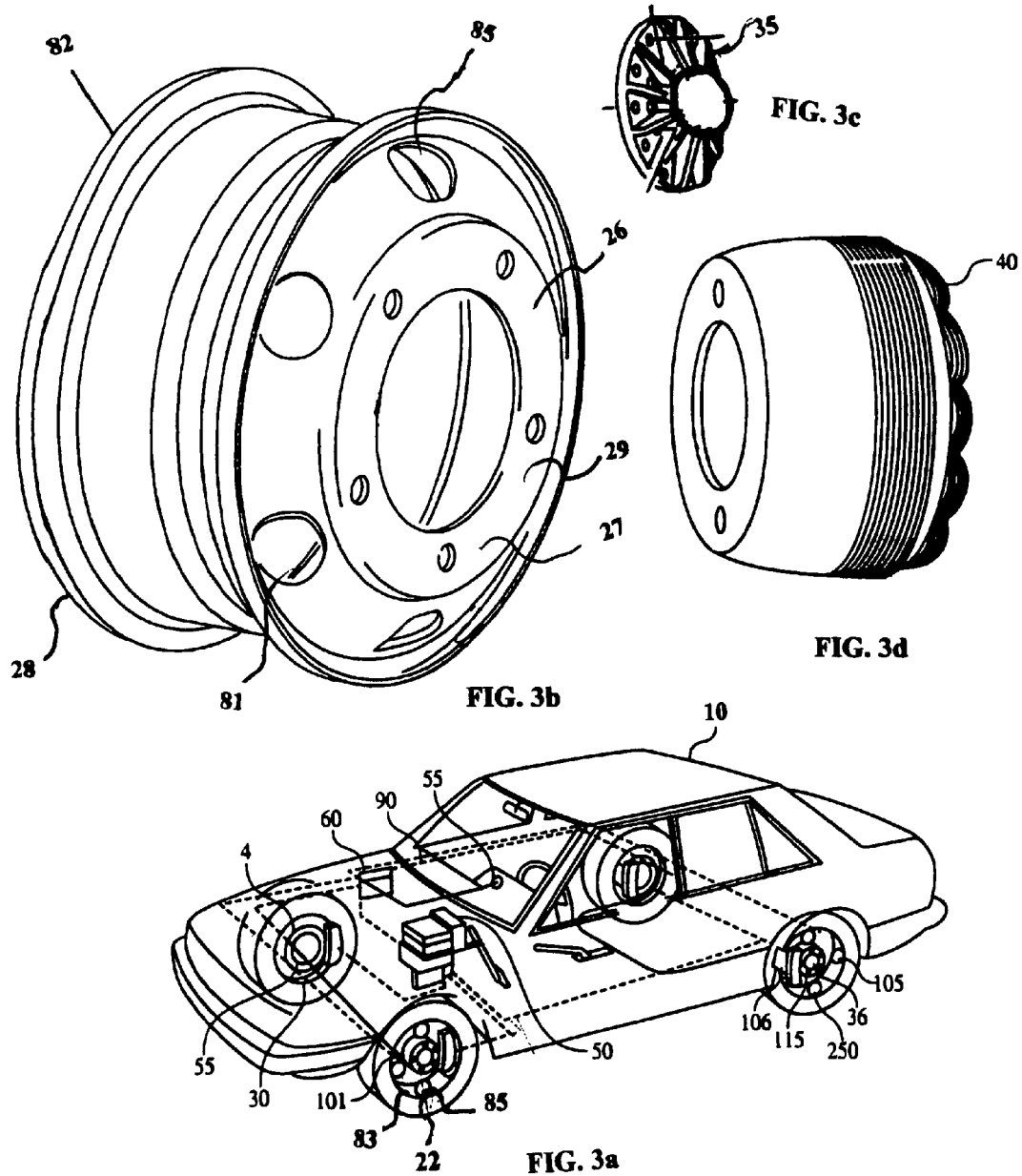

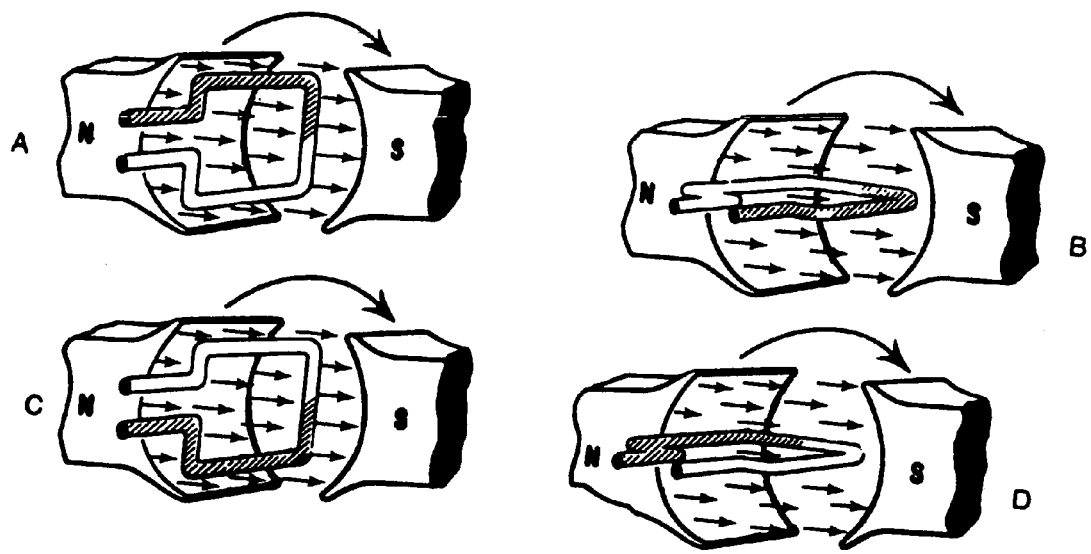
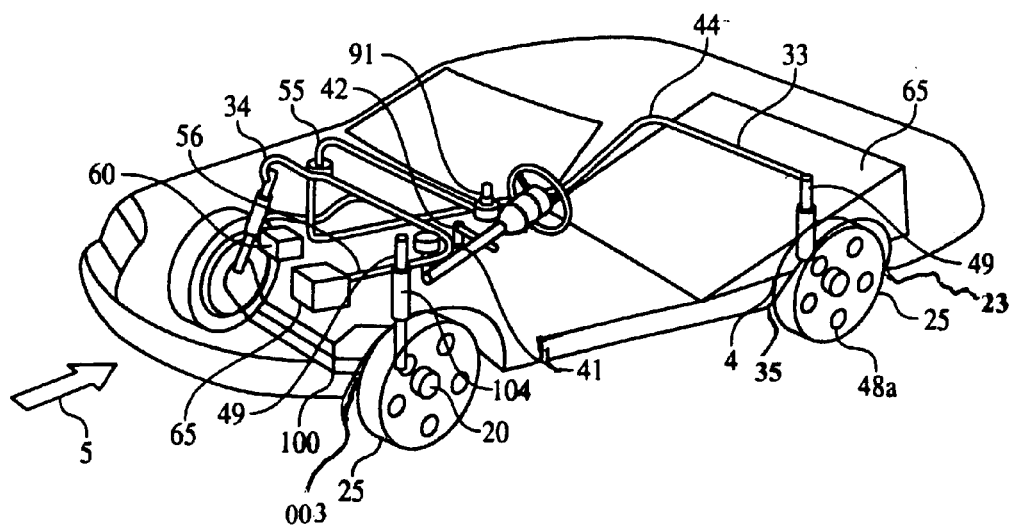
FIG. 7

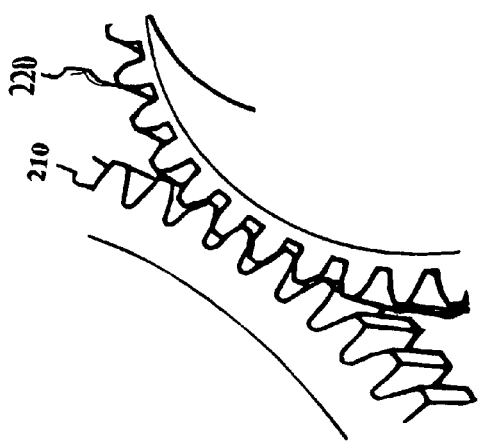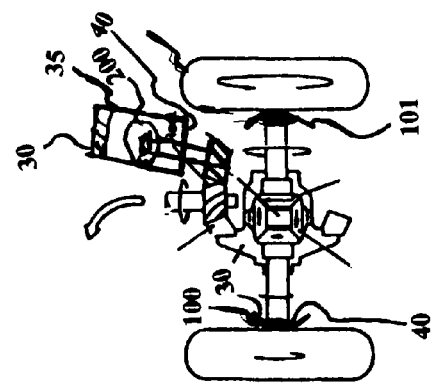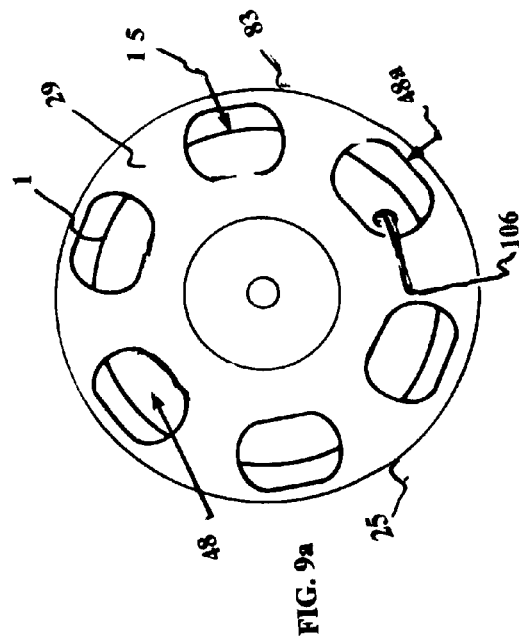

RENEWABLE ENERGY SYSTEM FOR ELECTRIC VEHICLES

TECHNICAL FIELD OF THE INVENTION

READS-77 is a Renewable Energy Advanced Device Solution. The number 77 "seventy-seven" is read seven-seven, representing twice the degree of perfection because the device is the technology that would advance and expedite the development of electric vehicles, EV-77. With the rapid increase in electronic devices in newer vehicles, maintaining battery energy is accelerated and battery live prolonged with the development of READS-77 because the capacitance means of the present invention is configured with, and responsive for energizing some of the electronics.

BACKGROUND OF THE INVENTION

The invention relates to a renewable vehicular energy generator, specifically to such vehicles which utilizes a plurality of wheels, having horizontal axis of rotation, disposed in at least one wheel, and having means for connecting a clutch means rotating relative to the direction of the wind and configured with means for accelerating and guiding the wind towards airfoiled surface of the clutch means. The invention also relates to the power vehicles utilizing the energy of the sun by converting the energy collected by solar panels into electrical energy.

This invention further relates generally to an electrically powered vehicle and more particularly to a system for charging an electrically powered vehicle battery/motor utilizing a controllable wind-operated turbine configured with a clutch means and electricity generating device/generator armature for energizing the battery cells while the vehicle is in motion.

An object of the present invention comprises energy transfer elements consisting of at least a single or multiple miniaturized transformer windings. The electrical generator armature/transformer provides a low reluctance path for a magnetic flux coupling input and output windings.

During normal operation of the vehicle, the voltages across both input and output windings of the generator armature transition in accordance with the standard energy supply operation. These transitions generate displacement energies in the electrical path through the various capacitances configured with the vehicle electrical energy means, wherein at least a capacitance is responsive for supplying energy to the vehicle's standard and future in-vehicle applications, such as power windows, power doors, stereo system, GPS system, TV system, etc.

The increasing use of gasoline powered "Green House Energy" vehicles is significantly contributing to environmental pollution, environmental noise, refining pollution from crude oil. Electrically powered vehicles have been known for solving some of the problems associated with gasoline powered vehicles, but not completely developed in widespread use that would durably operate without being recharged on a periodic interval. These periodic charging are drawbacks when compared to conventional gasoline powered engines and/or hybrid vehicles. The present invention is related to an electric powered vehicle that can produce electrical energy at any scale and at a lower cost compared to power vehicles that utilize other sources of energy, such as gas and alternators. The invention generates energy by utilizing and accelerating the lowest available wind relative to the vehicle line of motion.

The proposed invention does not need as much installation time or repairs, maintenance, or expensive protection against environmental disasters, such as snow and dust. There is no energy vehicle with known availability of a wind powered vehicle utilizing the advantages of the wind and sun as a source of energy. The present invention, utilizes the wind and/or solar energy to produce electrical energy on a large scale, uses at least a generator for transforming the energy of the wind into electrical energy.

The alternative wind powered vehicle comprises at least a motor, battery, wind energy generator means for recharging the battery, a processor means connected to the accelerator pedal for directing the flow of energy from a capacitance means to the battery and from the battery to the motor. The motor of the vehicle is configured with harnesses communicatively connected to the batteries and electrical energy is communicated through the processor means. The processor means transfers the electrical energy to kinetic energy that propels the vehicle. The switch means is operatively connected to the motor to enable the flow of electricity that propels the motor in forward or reverse direction. The motor is configured with regenerative braking means responsive or conservation of energy by means of transferring the kinetic energy back to electrical energy when pressure on the accelerator is released to enable the conversion energy to initially slow down the vehicle. A battery cell means is provided responsive for additional energy storage that further powers the electric motor of the vehicle.

In an instant of the present invention invention, wheel hubs are operatively connected to the clutch means configured with blades/cups comprising discharging the air after a cycle of rotation to avoid creating friction with the ambient air, and are stacked on a horizontal of the wheel structure, interconnected with each other and operatively connected to an electrical generator, positioned at the wheel base or within the vehicle. The clutch means is constructed with opposing guiding plates to direct the wind to the blades so that the air of the wind could freely slip outside of the clutch means blades. In other aspect of the invention, the rotation of the clutch means could be synchronous. In other aspect of the invention, the wheel axle comprises at least the clutch means and the structural frame of the wheel splitting the wind into two streams. Still, in other aspect of the invention, the clutch means are rotated by at least the frictional forces of the pressured medium, the clutch means are balanced, and the clutch means axle structures are loaded symmetrically, avoiding damaging centrifugal forces and the related stresses. The invention increases the speed of wind by stationary means and creates energy at a wind speed less than 3 miles per hour on near ground environment. This invention utilizes a generator armature configured with a clutch means.

At least a capacitance responsive for switching power supplies is configured with the electric motor to reduce the common mode emissions and increase continuous operation of the vehicle. This capacitance provides a low impedance path for displacement energies flowing between input and output windings of the generator armature. The energy transfer specifically deals with the reduction in common node noise by the energy transfer elements, such as the generator armature/transformer. The energy flows capacitatively between the core of the transformer and the electrical energy. The wind power generator provided with a wind wheel axle rotating in a tunnel shaped chamber through which air flows at a variable speed, generating aerodynamic properties, is capable of generating high output power by efficiently accelerating the wind flow. The wind power generator comprises the tunnel shaped chamber expanding toward a flowing direction of wind and causing the generator armature responsive for generating electricity. The hub is disposed at a position adjacent to an entrance of the wind into the tunnel shaped chamber.

The present invention increases the range of electrically-powered vehicles by charging the batteries while the vehicle is in motion and storing excess energy to energize in-vehicle accessories. The approach of the present invention has not been taught by any or combination of the following inventions.

U.S. Pub. No. 20060213697, to Sutherland Danilo relates to electrical vehicle power systems consisting of a power generating device such as a solar panel on the roof of a vehicle and a wind turbine raised outside the body of a vehicle.

U.S. Pat. No. 7,135,786, to Deets Edward teaches a shrouded enclosure mounted on a vehicle roof, comprising an air intake formed by controllable shrouds, a turbine, an electricity generating device, and a discharge outlet.

U.S. Pat. No. 6,497,593, to Willis Peter teaches a wind powered vehicle for propelling the vehicle with the wind.

U.S. Pat. No. 6,406,090, to Tolinski, et al, entitled "Self-Powered Solar Sunroof", discloses a solar panel powering device disposed within a vehicle's sunroof. However, Tolinski's device does not disclose using the solar panels to provide electrical power sufficient to energize the vehicle electrically.

U.S. Pat. No. 6,138,781, to Hakala James relates to a wind powered system for generating electricity in a vehicle by startup/backup air compressor that discharges air directly to a multistage impeller.

U.S. Pat. No. 5,680,032 to Pena Mario, relates to a system in which air is captured at the front of a vehicle and channeled to one or more turbines. The air from the turbine is then discharged at low pressure regions on the sides or rear of the vehicle. In this teaching, the generator is rotably engaged with a flywheel.

U.S. Pat. No. 5,280,827 issued to Taylor et. al. teaches a long Venturi tube extending along an upper portion of a vehicle that directs air flow from the front of the vehicle to a large wind turbine mounted at the rear of the vehicle. In their teachings, the wind turbine rotates about an axis perpendicular to the axis of the vehicle body, and a pair of elongated lower screw-type turbines is also contained in separate lower venturi effect tubes extending along the lower side of the vehicle below the passenger cab and discharge to aid in the rotation of the large, rear-mounted wind turbine. The teaching of Taylor et al will require substantial reconfiguration of the vehicle body structure.

U.S. Pat. No. 4,423,368 issued to Bussiere teaches an air duct extending from an inlet along the roof section of a vehicle body above the windshield and over the passenger compartment to air outlets located in the rear fender wells of the vehicle. Plurality air turbines are operatively connected to electric generators and positioned at the air outlets driven by air currents flowing from the duct. This teaching will also require reconfiguration of the roof structure, which is not quite reliable.

U.S. Pat. No. 4,254,843 issued to Han et. al. teaches a whirl ventilator system to produce a whirling air flow that rotates a fan configured to drive an alternator such that air flow from the movement of the vehicle generates electricity to charge batteries. The batteries are connected to an electric motor which rotates a drive shaft, which is coupled to a driven shaft through a clutch mechanism. The driven shaft rotates an axle via a conventional differential mechanism. The clutch mechanism has a flywheel mounted about it, and the flywheel is rotatively engaged with an electric generator. This teaching uses an electric motor to rotate a drive shaft configured with a clutch means.

U.S. Pat. No. 4,168,759 issued to Hull, et. al. teaches an impeller mounted nearly horizontal in a chamber above the passenger compartment of an automobile. Rather, the chamber has an opening in its front for receiving air and a rear exit vent. The impeller here, is rotated by air forced through the chamber and mechanically coupled to a generator to provide auxiliary power for the automobile.

U.S. Pat. No. 4,090,577, to Moore, et al, teaches a vehicle powered by a combination of electric and combustion engines, with solar cells disposed within the upper surfaces of the vehicle. However, Moore does not include any method for charging the electrical system at night, or during overcast conditions when an external charger is not sufficiently available. The above patents have contributed to the art of electrically-powered vehicles, but significant improvements are needed to solve the short travel distance problems associated with such vehicles. The present invention, however, addresses the above-noted problems, providing efficient system's solution for charging batteries while the vehicle is in motion and when the vehicle is intermittently stopped, eliminating the problem of occationally plugging in into outlets.

BRIEF SUMMARY OF THE INVENTION

The present invention disclose a renewable vehicular energy generator comprising variable high speed generator armatures for producing the electrical energy and capable of utilizing even the smallest wind. The wind power generator according to the present invention comprising a tunnel shaped chamber through which air flows at a variable speed, generating aerodynamic properties expanding towards a flowing direction of wind and a wind wheeled axle connecting a clutch means turbine configuration with the generator armature/rotor responsive for generating electricity, disposed at a position adjacent to an entrance for a wind flow into the tunnel shaped chamber.

In other embodiment of the present invention, the tunnel shaped chamber is disposed at an open space comprising the static pressure of wind both in front of the entrance and at the rear of the exit, which is substantially equal to the static pressure of atmospheric pressure outside the tunnel shaped chamber. The pressure greatly drops around the entrance inside the tunnel shaped chamber. Accordingly, wind flowing in from the front of the entrance into the tunnel shaped chamber sharply accelerates around the entrance and gradually decelerates toward the exits, while the pressure is recovered to substantially equal to the static pressure of the atmospheric pressure at the exit.

The tunnel shaped chamber expands toward a flowing direction of wind, which has negative pressure and converges around a position on a slightly downstream side of the entrance inside the tunnel shaped chamber, which provides an area of high-speed wind to output wind power thereat, which is then converted into electrical energy.

At least a powerful and quiet clutch means is provided and connected on one wheel axle. The wheel has a base and the clutch means has plurality of blades spaced apart and distributed along an axis of symmetry. Each of the wheels is configured with at least a stability conversion means, a wheel rim, and wheel hub cover, and providing an inner space for generating electrical and mechanical energy to enable power storage. Both the rim and the hub cover are having wind passage the shape of a polygon with angles between vertical sides, providing air flow space there between.

A plurality of vertical/horizontal supports is secured between the stability conversions, forming air concourses between the hubs of the axles and the wheel, these air concourses creating openings for the wind, blowing from every direction between the supports and the stability conversions. The generator armature/rotor is mounted on the wheel axle, one generator armature in each of the air concourses, each of the generator armatures having an imaginary vertical/horizontal plane of symmetry, and identifying one side of the generator armature facing the wind, as a front side, and the opposite side vehicle side, positioned in the direction of the wind is the back side. The generator armature is operatively configured with a battery cell operatively connected to a microprocessor. The microprocessor is responsive for communication and for monitoring the energy environment of the cells and allows it to be renewed at a rate that will not generate excessive heat on the batter cells.

Each of the generator armatures comprises means for transforming wind force into electrical energy and equipped with at least: (1) a clutch means, having horizontal axis of rotation perpendicular to the vertical plane of symmetry, positioned on axle structural assemblies, or mounted on the supportive structure; (2) an airfoiled surface, opened to the wind flow from the entrance, defined by the front side, to the exit, defined by the back side, mounted on the supportive structure and encasing the upper and the lower lines of clutch means placed in opposite side of the vehicle axle, and plates on two opposite side of the vehicle axle on the vertical walls, allowing the central half-shafts of the clutch means to protrude through the vertical walls to the axle structural assemblies, controlling the wind into a tunnel shaped chamber; (3) a tunnel shaped chamber through which air flows at a variable speed, generating aerodynamic properties, configured with the airfoiled surface capable of having a low/high flow, gradually converging in the vertical direction entrance to the wind, and contracted in the vertical direction by guiding plates, defined as a wind way, and a high and wide exit, gradually expanding in the vertical and the horizontal directions and positioned in the exit of the airfoiled surface.

The tunnel shaped chamber through which air flows at a variable speed, generating aerodynamic properties is covered from the wind most of the surface of the clutch means, allowing at least one blade of each clutch means to protrude in the wind way upwardly in one configuration, and other configuration downwardly for the clutch means defined as the upper line. The blades of the clutch means of the upper line appears in the wind way between the blades of the clutch means of the lower line, allowing the clutch means to discharge the air in the direction of the back side of the tunnel shaped chamber through which air flows at a variable speed, generating the aerodynamic properties.

The wind blows from the entrance through the wind way towards the exit, striking on the blades of the clutch means and causing a rotation in the counter-clock wise direction "relative motion" when the clutch means is on the lower line, and in the clock-wise direction when the clutch means is on the upper line. Air is pressed in the vertical direction in the wind way and flows according to the law of conservation of mass, which constitutes that; the mass of the air entering into the entrance of the airfoiled chamber is equal to the mass of the air passing through the cross-section. The speed of the flow is bigger than the speed of the wind at the entrance of the tunnel shaped chamber through which air flows at a variable speed and in relation to the ratio between the height of the entrance to the height of the wind way, since the width of the tunnel shaped chamber where air flows at such variable speed remains the same. The clutch means have more power if configured with the tunnel shaped chamber of the present invention as compared with the same clutch means placed in an ambient wind flow.

The efficiency of the clutch means is limited to at least 60 percent of the power of the wind and 40 percent the axle rotation, minimizing frictional force, though a lose of the power of the clutch means may occur due to friction, viscosity, turbulence and other associated factors. Applicant also assumes that one will utilize at least 40 percent of the power of the clutch means for producing electrical power and the remaining 60 percent will go to the axle rotational force. Additionally, the power of the generator armature when configured with at least a clutch means as an example, will proximate the power of more than 200 clutch means of the same size, placed in the ambient wind of a radiator fan, taking into account the increase of the tunnel suction resulted in lowering of the static air pressure at the exit of the tunnel shaped chamber through which air flows at a variable speed. Accordingly, the armatures as implemented in the invention is configured with a diffuser, a booster and other means that can restore the speed of the wind, striking on the blades of the next clutch means to the environment of the speed of the wind that strikes on the first blades.

The generator armature of the present invention is operatively configured to generate energy at the speed of the ambient wind less than at least 7 m/h. This speed is considered low to find any known devices that have large clutch means. Though, this is the average speed of the wind blowing mostly around the environments near the ground as the vehicle begins to motion. Automotive companies or consumers will not be looking for the windiest places for the power vehicles to wheel them at high elevations. A small increase in the speed of the wind creates about 60 percent increase in power. The blades are configured so that the clutch means propels the said blades when the energy environment is required to be raised. The clutch means is further configured with means to prevent the blades from accelerating the flow of the wind when the microprocessor communicates that the energy level is sufficient, thereby prolonging the life and reducing frictional force effect on the clutch means.

The clutch means is further configured to be enabled when the vehicle is in motion with the blades propelling wind of no less than 7 m/h to produce the average power from the electrical generator and, at the same time, there are long periods of time, when the vehicle will store excess energy, since the average speed of the wind is much less at some conditions. The invention is configured to energize any vehicle and at any environment, increasing many times the existing wind at the vehicle wheel base. The behavior of the tunnel shaped chamber is comparable with the flow of a river, rushing fast between high and narrow banks after a slow motion along wide planes. All water passing between the narrow banks, according to the law of continuous flow. The speed of the wind between the narrow banks is as many times faster, as many times the distance between the wide banks at the entrance will be bigger than the distance between the narrow banks.

To ensure, that the wind blows with such high speed all along the wind way, the invention has several innovations:

1. The exit of the tunnel shaped chamber through which air flows at a variable speed for generating aerodynamic properties has bigger cross-sectional dimensions than the entrance, which creates a gradual expansion of the air flowing out of the tunnel shaped exceeding the volume which it had at the entrance, enabling a drop in the static air pressure at the exit and increasing the tunnel suction in the wind way to promote the wind flow from the entrance to the exit.

2. The tunnel shaped chamber through which air flows at a variable speed for generating aerodynamic properties, has a cross-sectional view along the vertical plane of symmetry similar to a venture and a shape of a rectangle in the cross-sectional view perpendicular to the wind flow to enable contracting the wind in vertical/horizontal dimension of the converging nozzle panel, thereby creating minimal disturbance and very small whirl for the wind streams.

3. The converging nozzle panel for the entrance of the tunnel shaped chamber through which air flows at a variable speed for generating the aerodynamic properties is configured with inner and outer plates connecting the vertical and horizontal slots in the outer plates and allowing some distances between the plates for the air to strike on the plates and passing through the slots to flow to the wind way between the plates, breaking down the possible small whirl at the entrance.

4. A diffuser responsive for providing an extended zone of low static air pressure for the exit of the tunnel shaped chamber through which air flows at a variable speed and a tunnel suction in the wind way.

5. A booster responsive for providing extensions to the areas of the entrance and the exit of the tunnel shaped chamber through which air flows at a variable speed for generating the aerodynamic properties and increasing the contraction ratio of the tunnel shaped chamber at the same time, diminishing the small whirl at the entrance and lowering the static air pressure at the exit.

6. A clutch means capable to withstand any high rotational speed is configured to generating energy in succession with the turbine, and to transfer a large rotational torque towards at least an electrical generator armature to be further transformed into electrical energy.

7. A symmetrically loaded horizontal mounting of the clutch means, allowing high rotational speed on the radial axle structural assemblies, configured with less possible resistance for the rotation and symmetrical distribution of the applied stress on the blades of the clutch means.

8. Solar panels comprising solar cells, affixed on the dashboard panel, and configured with a microprocessor means communicatively connected to the solar panel tiltable plates mounted along/across the dashboard. In one embodiment, the solar panel could be configured and responsive for deflecting the wind from the stability conversions towards the air concourses, located above the stability conversions. These panels and plates are further configured for gradually contracting the wind streams flowing towards the air concourses, increasing the speed of this wind streams, and gradually expanding the wind streams flowing from the air concourses.

9. The solar panels mounted on the dashboard panel further configured for converting the solar energy into electrical energy and operatively connected to the microprocessor means coupled with capacitance means responsive for power storage assemblies which may be positioned within the structure of the vehicle or in the stability conversions.

The electrical energy collected by these storage assemblies can be used for initial orientation of the generator armatures.

Innovations have not produced electrical energy exceeding the energy produced by the conventional alternator. The automotive wind energy has much bigger and less expensive applications and very capable of generating energy in the wide range of the wind speeds, suitable for the present invention. The disclosed features of the present invention intercepts most of the energy of the wind blowing towards the whole area of the front side of the wheel, including the areas of the stability conversions and the air concourses, and concentrates the energy on the small areas of cross-sections of the tunnel shaped chamber through which air flows at a variable speed, generating aerodynamic properties, at the same time increasing the suction in the tunnel shaped chamber at the back side of the wheel.

Accordingly, an object of this invention is to provide renewable vehicular energy through a generator armature communicatively connected to a clutch means operatively connected to the vehicle's axle and capable of producing large amount of electrical energy through the wind force.

Still, another object of the present invention is to provide an airfoiled surface and a tunnel shaped chamber through which air flows at a variable speed, generating aerodynamic properties capable of increasing the vehicle wind and encasing plurality of clutch means configured with the airfoiled surface and the tunnel shaped chamber and completely utilizing the energy of the wind accumulated therefrom. Yet, another object of the preset invention is to implement a clutch means capable of withstand very high rotational speed and transferring large rotational torque and energy quietly and smoothly. The clutch means having a relatively small diameter. The object of the invention is to further achieve many other objectives, such as putting a plurality of clutch means on a vehicle operatively connecting plurality of electrical generator. The conventional clutch means in a vehicle creates big centrifugal forces and stress related failures. The present clutch means of the instant invention is suitable to energy in consecutive line with other clutch means, capable to energy with wind above 100 miles per hour configured with resistant to any harsh conditions, such as ice, snow and rain.

Another object of the present invention is to install symmetrically at least a generator to a clutch means, so that each of the generators comprising an armature loaded with only a half of the rotating torque. Still, another object of the present invention is to provide a clutch means, rotating in the direction of the wind and relative to the direction of the vehicle having radial axle structural assemblies. Yet another object of the present invention is to provide a fully microprocessorized control of the energy generated by the wind powered vehicle. This control include constant monitoring of the rotational speed of the clutch means, closing the entrances of the tunnel shaped chamber through which air flows at a variable speed, and generating the aerodynamic properties while also providing idle rotation for the clutch means, positioning the generator armatures towards the prevailing direction of the wind.

Still another object of the present invention is to utilize the solar radiation in addition to the wind power to receive the electrical energy by installing solar panels on the dashboard panel and in communication with the electrical generator armature operatively connected to the axle of the wheel configured for realizing an additional source of energy when the electrical generator armature is stopped, and for reducing continuous operation of the clutch means due to friction.

Yet another object of the present invention is to place the clutch means on the walls of the airfoiled surface, the tunnel shaped chamber through which air flows at a variable speed, generating aerodynamic properties configured with seals such as protective steel seals for minimizing environmental effect on the impact of the power vehicle. Other objects and advantages of the invention will become apparent from a consideration of the drawings and the description.

BRIEF DESCRIPTION OF THE SEVERAL
VIEWS OF THE DRAWING

FIG. 3 is seen a vehicle configuration showing the airfoiled surface, the rim, the tunnel shaped chamber through which air flows at a variable speed, generating aerodynamic properties and four clutch means.

FIG. 7 is a cross-section of the generator armature depicting the airfoiled surface, encasing the clutch means for the vehicle.

FIG. 9 depicts the air foiled surface, a differential configuration of the clutch means, a cross-section of the gears responsive for transmiting rotation to said clutch means, a generator armature, equipped with the booster, and the diffuser.

DETAILED DESCRIPTION OF THE PREFERRED INVENTION

Figure 1:
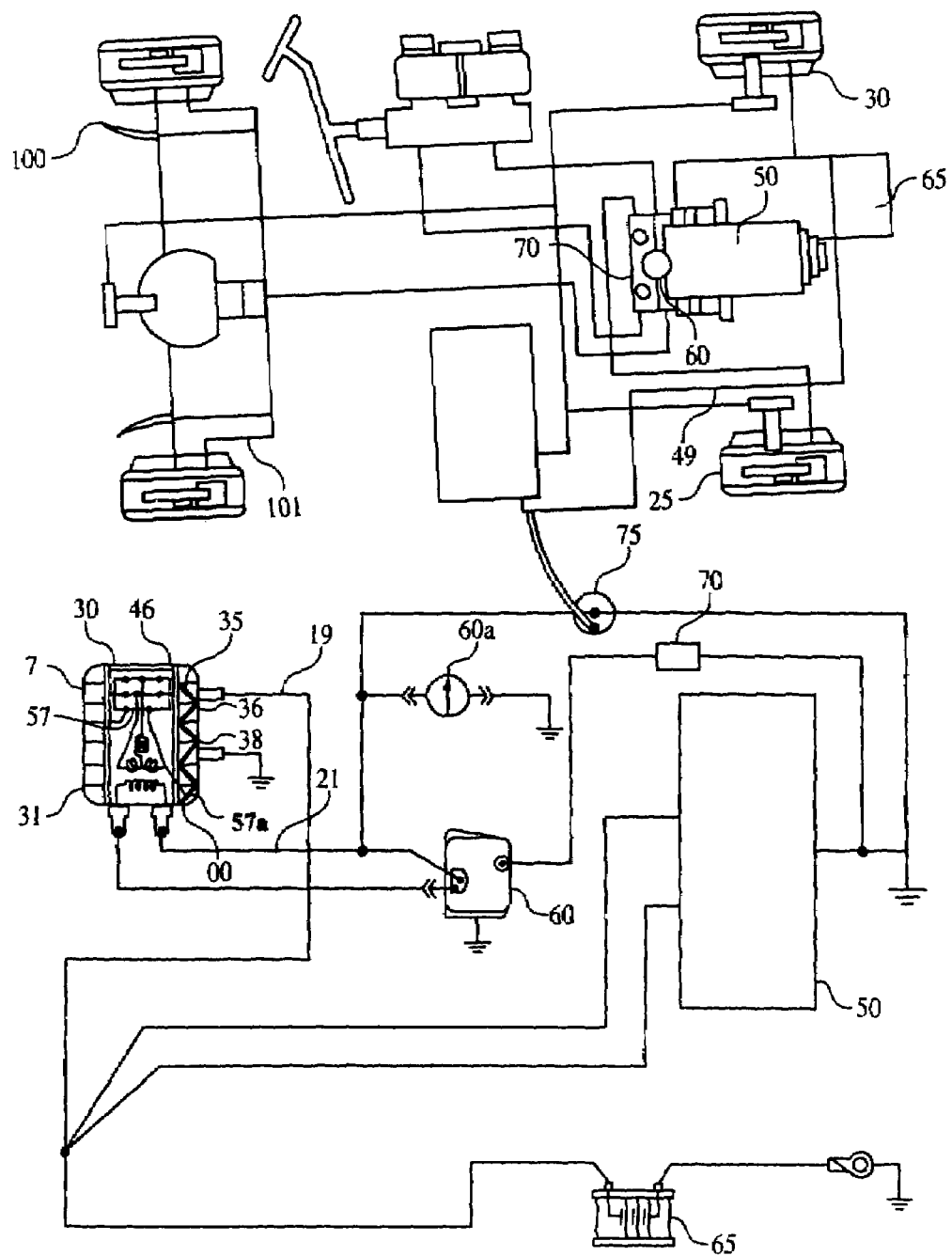
FIG. 1 is a schematic view of a vehicle comprising elements of the present invention.

READ-77 is an alternative renewable energy which is at least wind powered and comprises at least a motor 50, a battery cell means 65, a clutch means 30, a generator armature 40, a communication means 70 configured with a capacitance means 60 and operatively connected to an accelerator pedal 300. The communication means is configured for directing the flow of energy from the capacitance means 60 to the battery cell means 65 and from the battery cell means 65 to the motor 50. The motor 50 of the vehicle 10 is configured with harnesses 44 communicatively connecting the generator armature 40 with the capacitance means 60, the capacitance means 60 with the communication means 70, and the communication means 70 with the battery cell means 65 further responsive for supplying electrical energy to motor 50 and other electrical appliances for vehicle 10. The communication means 70 transfers electrical energy to kinetic energy that propels the vehicle 10. Said communication means 70 comprises means operatively configured to connect the motor 50 to enable the flow of electricity that propels said motor 50 in forward or reverse direction. The motor 50 is configured with regenerative braking means 115 responsive for conservation of energy by means of transferring the kinetic energy back to electrical energy when pressure on the accelerator pedal 300 is released to enable the conversion energy to initially slow down vehicle 10. The battery cell means 65 is responsive for additional energy storage that powers the motor 50 for vehicle 10.

Referring to FIG. 1a is seen an EV-77, which is wind powered by the opposing wind force 5 against the direction of a vehicle 10. The force is greater and varies at varying speed. The design configuration of the EV-77 is centered on the axle 20 of the vehicle 10 configuration with a clutch means/turbine 30 operatively connected to a generator armature/rotor 40 symmetrically configured on the same axle 20 with the wheel 25. The axle shaft 15 propels the wheel 25 and the clutch means/turbine 30, enabling the blades 35 of the clutch means/turbine 40 to accelerate the opposing wind 5. The opposing force there between is then converted into electrical energy by the generator armature/rotor 40. This energy is the energy required to power an electric motor 50 for the vehicle 10. The shaft 36 of the clutch means/turbine 30 is further configured such that, as the axle 20 spins, the rotation is then transferred to the shaft 36 for the clutch means/turbine 30, enabling the generator armature/rotor 40 to then convert the rotational speed into electrical energy required for empowering the electric motor 50 for the vehicle 10. As the vehicle 10 makes frequent stops, heat is created due to friction, and the sensor means 55 traps the heat and the generator armature/rotor 40 converts the heat into electrical energy required for the electric motor 50 of the vehicle 10.

Any of the three means of energy transformation-completion constitutes a renewable energy as shown in FIG. 1b, that is then transferred to a capacitance means 60 configured with a battery cell means 65 that stores the amount of energy generated and tha capacitance means 60 transfers the required energy necessary to operate the electric motor 50 for the vehicle 10 effectively. A communication means 70 is operatively connected between the capacitance means 60 and the battery cell means 65 responsive for enabling communication with the capacitance means 60 when additional energy is required for the battery cell means 65. In other embodiment, the communication means is a microprocessor.

Figure 2A:
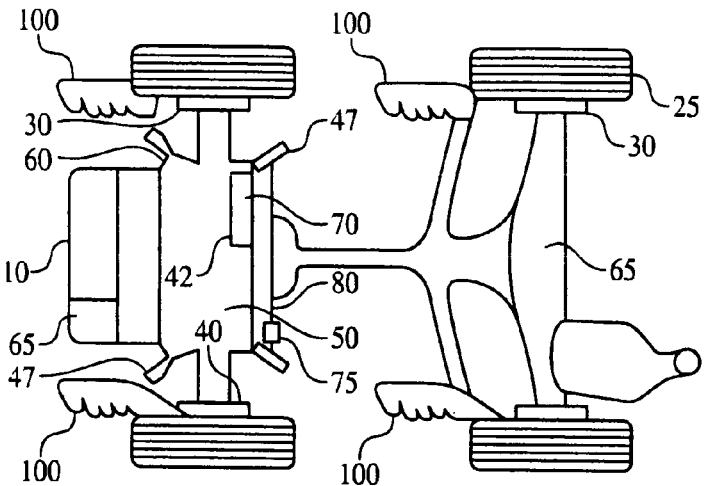
FIG. 2 is a cross-section of the power vehicle configured with views of the clutch means showing connections to the brake means and axle structure, the electrical generator armature is sectioned to show other embodiments as described in the invention.
Figure 2B:
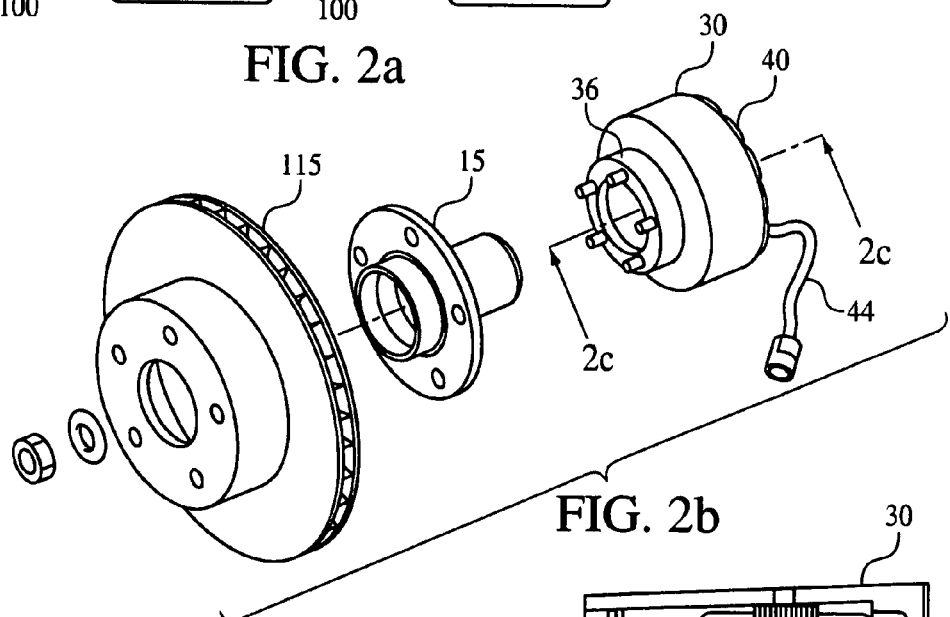
Figure 2C:
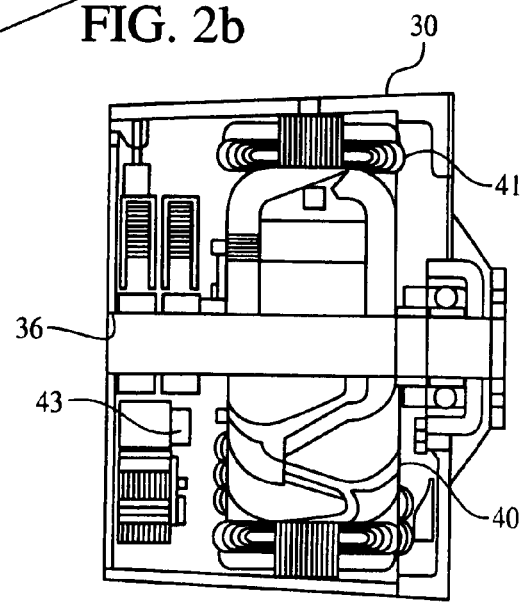

Referring to FIG. 2a is seen a vehicle 10, a generator armature 40 comprises an electromagnetic device that converts mechanical energy into electrical energy. The generator armature maintains the operating energy required for the battery 65 to operate the electric motor 50 effectively and further supplies power to the capacitance means 60, the ignition system 75, and all in-vehicle accessories 80. Voltage is induced in a field coil 41 seen in the section view of FIG. 2B as section AA, as a change in a line of force passing through the field coil is created. This voltage is generated in a field coil of wire "generator armature 40" as it is rotated in a stationary magnetic field. A mechanical switch 42, seen in FIG. 2a, is configured with the generator armature 40 operatively configured with the shaft 36 for the clutch means 30, and the shaft 36 rotates with the axle shaft 15 as seen in FIG. 2b. In the configuration, the brake rotor 115, the axle shaft 15, and the clutch means 30 have the same axis of rotation. The rotation creates voltage in the field coil 41, and the field coil 41 produces more voltage and current in the armature 40. A commutator 43 is configured with the armature shaft 36 and operatively connected to the field coil 41 in connection with segments of the commutator 43. The segments are insolated and sealed from the environment and could be spring loaded with brushes that ride on the commutator 43 to transmit voltage and current to the generator terminals 44 that allows electrical energy to flow to the battery cell means 65, capacitance 60, and electrical assoceries 80. The energy is generated by any of the followings:

(a) Moving a coil of wire through a magnetic field;
(b) Keeping the coil stationary and moving the magnetic field.

Referring to FIG. 3a is seen an upperwheel rim 26, a lowerwheel rim 27, having surfaces 81 and 82. The rim comprises of sides 28 and angles 29. Seen in FIG. 3b is a wind powered vehicle, generally indicated by the numeral 10. A wheel 25 comprising the rim is mounted on axle 20. The wheel 25 is erected symmetrically around an axis 22. A first stability conversion 23 responsive for absorbing vibration is shown at the lower environment near the axle 20. The stability conversion 23 depicts an upperwheel rim 26 and a lowerwheel rim 27. Both wheel rims 26, 27 positioned symmetrically relative to the axis 22 and to each other. The upperwheel rim 26 is configured with equal sides 28 and equal angles 29 between the sides 28. The sides 28 define a perimeter of the upperwheel rim 26 configured with the lowerwheel rim 27 similar to the shape of the upperwheel rim 26, and with the same number of equal angles 29 between the sides 28. Both wheels are configured with surfaces 81 and surface 82. These surfaces are configured for providing wind flow through the space located above the clutch means 30. Surfaces 81 and 82 may constitute a hub 83, operatively configured in connection with the clutch means 30 operatively configured with blades 35 seen in FIG. 3c, for propelling the the wind flow. A wall 84 configured with wheel 25 connects hub 83 with the space where the wind flow through along the perimeter of the upperwheel rim 26 and the lowerwheel rim 27, forming a flow chamber 85 around the wheel 25 with the aerodynamics controlled by the clutch means 30 responsive for allowing access to the flow chamber 85. The perimeter of the upperwheel rim 26 is smaller than the perimeter of the lowerwheel rim 27 in such a way that it provides a bigger distance from the vertical side of the lowerwheel rim 27 to the wall 84. The size of the flow chamber 85 provides a possibility to configure with the wheel 25 the flow chamber 85 and a clutch means 30 configured with electrical generator armatures 40 and/or in connection with at least solar panels 90 mounted within the vehicle 10 and/or the dashboard 91. The microprocessor 70 is configured for controlling the energy of the vehicle 10. Additional walls or plates are configured with the axle 20 or the stability conversion 23 to provide more rigidity and integrity to the structure of the flow of wind 5.

Returning now to FIG. 4a, plurality of stability convertions 23 are presented, positioned on each wheel 25. The wheel 25 is symmetrical relative to the imaginary vertical axis distributed between the the axle 20. The stability conversion 23 is positioned at the vertical axis of symmetry, defining the height of the wheel 25. Plurality of vertical/horizontal supports 49 are provided, secured between the seals 6 and 7 of the clutch means. The exact number of the vertical supports 49 and their cross-sectional size is chosen minimal to the axle weight for providing the stability for the wheel 25 and, at the same time, for providing less possible interference with the wind flowing between the supports. Plurality of air concourses 48 is formed along the height of the wheel 25 between the vertical supports 49 and the stability convertions 23. The air concourses 48 are configured for the flow of wind from every direction. Each of the air concourses 48 is operatively connected to a hub 83, provided by the upperwheel/lowerwheel rim 26, 27 and configured with the stability conversion 23. The hub 83 is covered with a laminated layer for providing less friction with the wind flow 5. The solar panel 90 is configured by known means, allowing turning the panels towards the sun during the different time of the day. Plurality of generator armatures 40 is mounted on an axle 20 and at least one generator armature 40 in each of the air concourses 52.

Figure 4B:
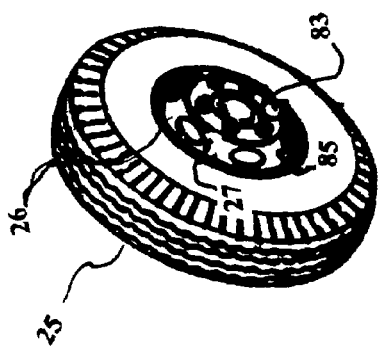
FIG. 4 is a diagrammatic configuration of the invention, depicting from the vehicle, the clutch means, the generator armature configured for the communication means and the capacitance means.
Figure 4:
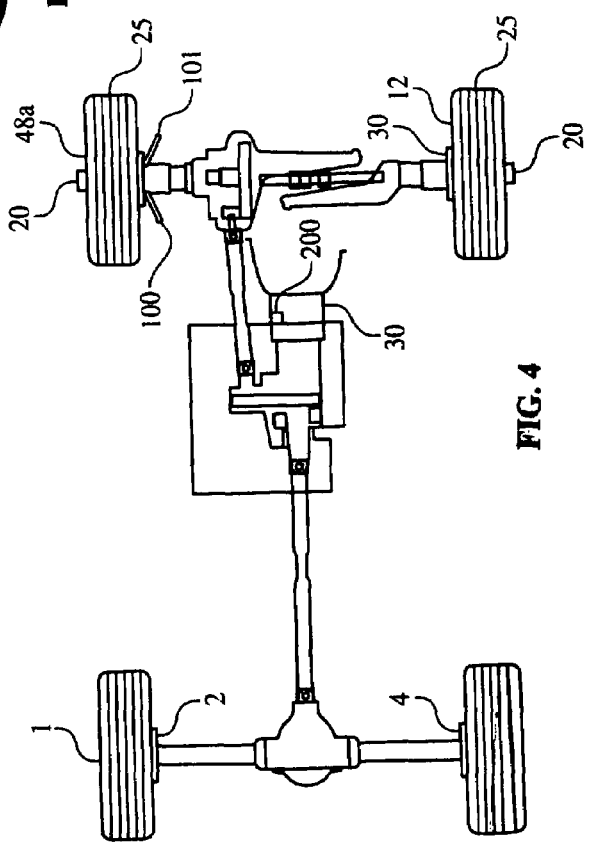
Figure 4A:
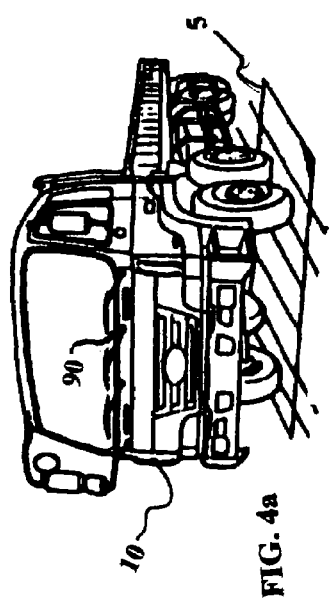

In FIG. 4 is seen the vertical support 49, seals 6 and 7, an angular plate 47, the solar panels 90 and the frames 36. The prevailing wind is shown by the numerals 5. The clutch means 30 is rotated when the wind flow. Referring to FIG. 4b is seen other embodiment, at least a servomotor 46 is configured with the clutch means 30 around the vertical axis 22 towards the prevailing direction of the wind 5 and in communication with the microprocessor 70. The supportive structure 49 mounted on the clutch means 30 symmetrically relative to an imaginary vertical plane of symmetry, crossing the axis 22. A lower line 19 and an upper line 21 of the clutch means, generally indicated by the numeral 30, having horizontal axis of rotation, are mounted on axle structural assemblies 18 on the supportive structure 49.

The axle structural assemblies 18 are mounted on at least a horizontal environment. All the clutch means 30 are configured for high rotational speed and are equipped with blades 35, having a shape of a triangular prism with two sides, one of which, shown by the numeral 37, defines a front side of the blade 35, and the order, shown by the numeral 38, defines a back side of the blade 35. The front side of the blade 35 is positioned on a part of a radius from the horizontal axis of rotation and has an outer end, defining the outer circle 00 of the clutch means 30 and an inner end, defining an inner circle 01 of the clutch means 30, the distance between these two circles defines the height of the blade 35. The back side of the blade 35 is connecting the outer end of the front side of the blade 35 with the inner end of the front side of the adjacent blade 35, creating a streamlined surface between the adjacent blades 35 and forming a closed perimeter 02 of the clutch means 30. This closed perimeter will not allow the wind 5 to penetrate inside the clutch means 30 and into the zone of the horizontal axis of rotation. The perimeter makes the clutch means 30 rigid and balanced, allowing high rotational speed and high rotating torque.

Figure 5:
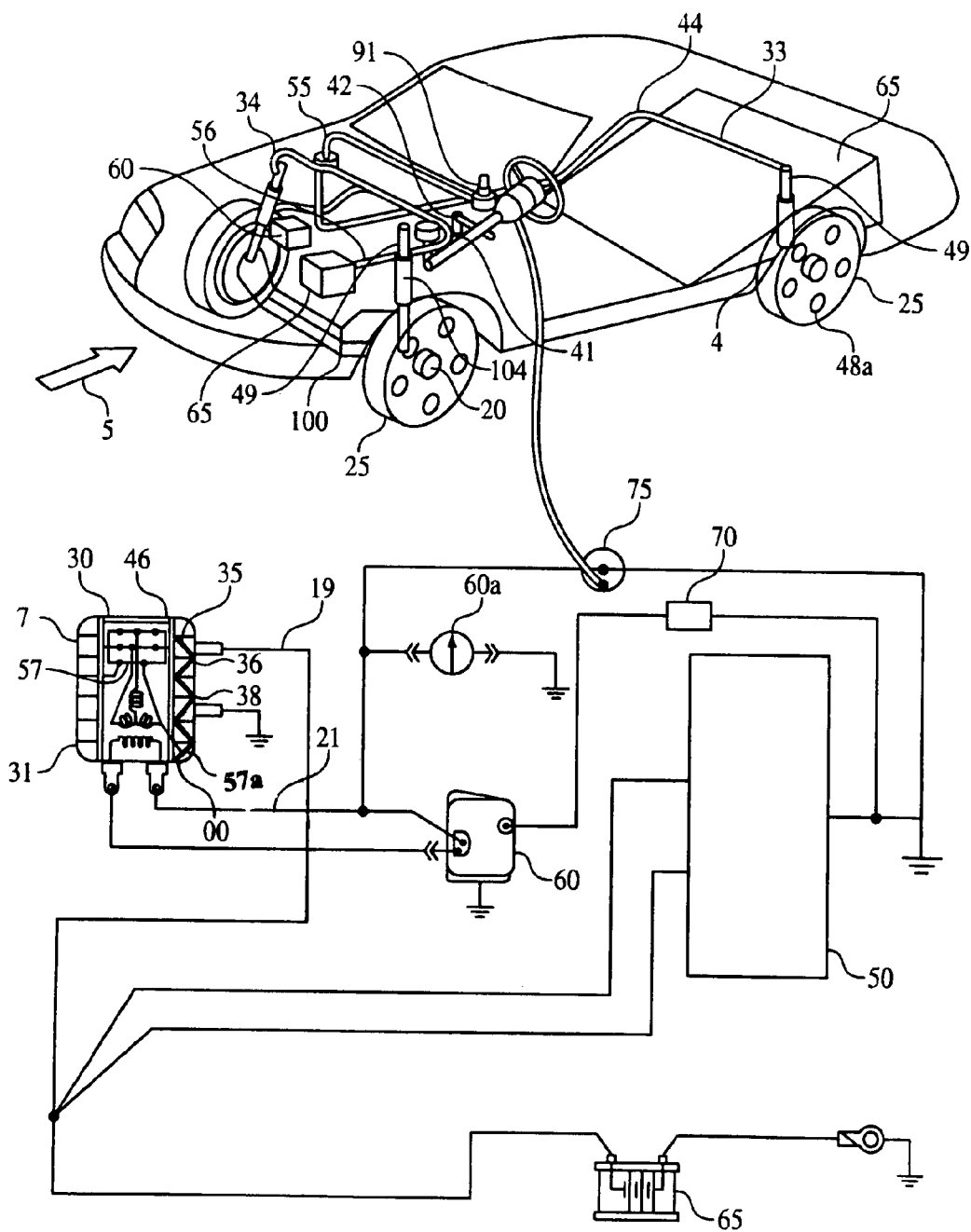
FIG. 5 is another depiction showing similar aspects of FIG. 5.

Referring now to FIG. 5, the number of the blades 35 is chosen to be sufficient to leave at least one blade outside of any tangential plane to the inner circle 01 of the clutch means 30. In othe embodiment, the clutch means 30 is positioned farthermost of the vertical axis of rotation 22 and has the front sides of the blades 35 facing the prevailing wind 5 above the horizontal axis of rotation. Stil in other embodiment of the present invention, the clutch means 30 faces the wind in the same manner, facing the wind 5 with the front sides of the blades 35 located above the axis 22. In some instances, the clutch means 30 are facing the wind with the front sides of the blades 35 located below the axis 22.

The blades 35 are made of thin sheet metal, bent at the lines of the outer circle 84 and inner circle 00. The blades 35 are also made of metal vanes, welded at the lines of connection 34 of the adjacent blades. The blades 35 are further made of light weight laminated sandwich panels 33, having at least two laminated layers, or of some other contemporary strong, durable, rigid and light materials. All the outer surfaces of the blades 35 are made of material that has less possible coefficient of friction with the air force/energy.

The clutch means 30 comprises a mounting base 31 assembled at the axle 20. The electrical generator armature 40 further comprises a module 41. The module 41 is positioned at proximity to the armature 40, and has at least a disk 42. A central wire harness/terminal 44 is connected to the module and configured with the disks 42, enabling an electromagnetic clutch means operation. The module disks are configured to provide additional rigidity to the clutch means 30 effective configuration of the generator armature 40. The generator armature 40 is configured with the module 41 to provide means for transferring axle 20 rotational torque from the haft 36 of the clutch means 30 into electrical energy required to operate the vehicle effectively. A sensor 55 for controlling the rotational speed of the clutch means 30 is configured with an actuator 56, responsive for activating the sensor 55. A diffuser 57 is further configured with the clutch means 30 responsive for controlling wind flow 5 into the airfoiled surface 4.

Figure 6A:
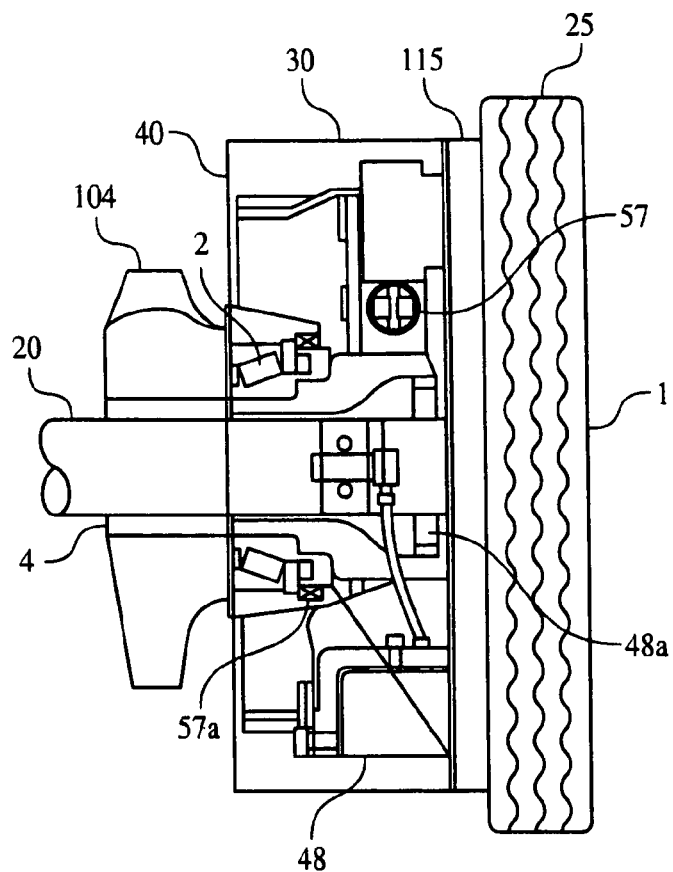
FIG. 6 is a schematic view of the vehicle comprising a view of the axle and clutch means configuration with the generator armature rotating in different direction. The configuration of the axle means is such that comprises drum or rotor changeability for the present invention.
Figure 6B:
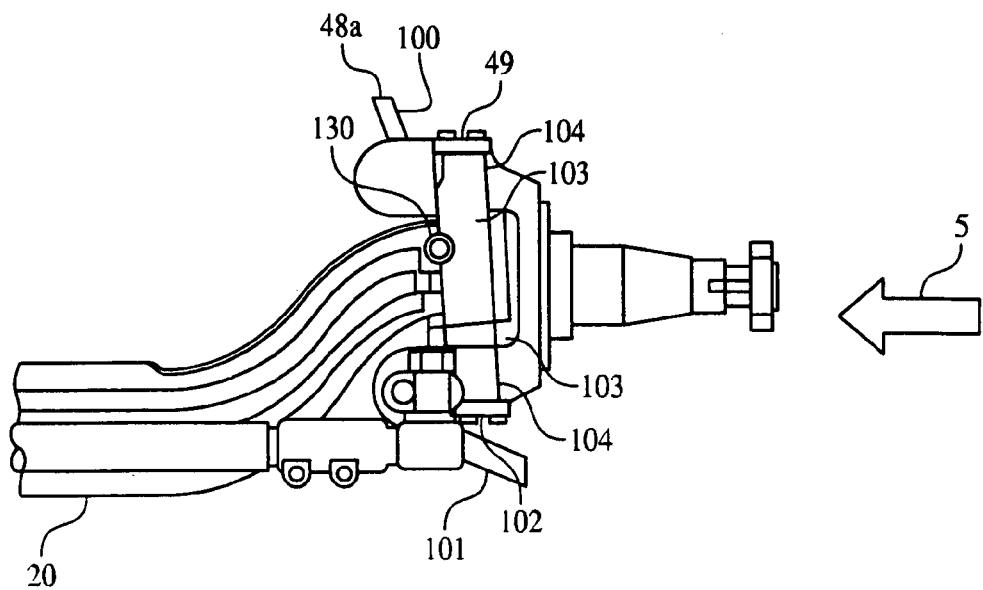
Figure 6C:
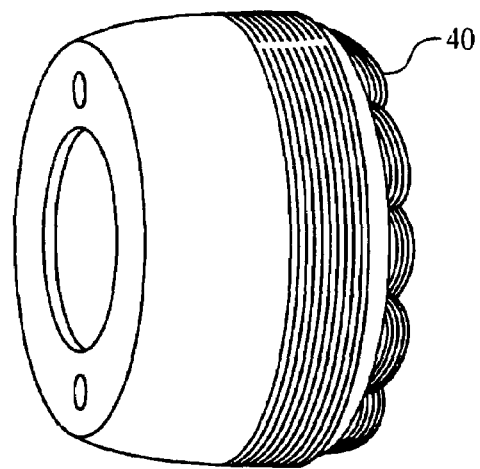
Figure 6D:
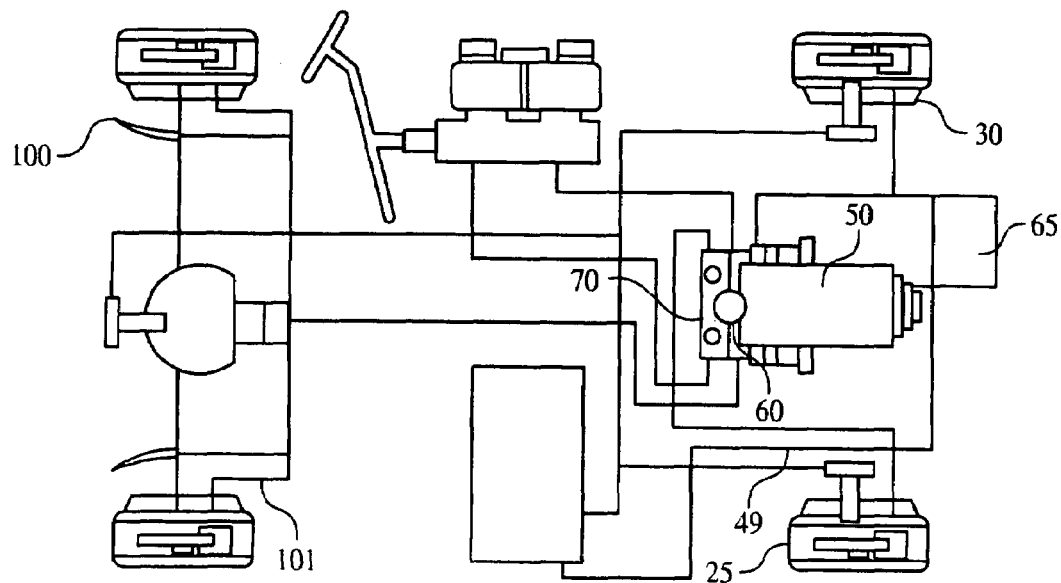

Referring to FIG. 6a is seen a simple outline schematic of the clutch means 30 and the electric generator armature/ transformer 40 configured with two ends for input windings/ nodes A and B, and two ends for output windings/nodes C and D as seen in FIG. 7. When there is a voltage transition on the input winding, node B approaches positive relative to node A, while the voltage on node D increases relative to node C. The voltage transitions generate displacement energy in a parasitic capacitances resulting in energy flowing to electrical earth, which is substantially reduced by the winding of the electric motor 50 for the vehicle 10 seen in FIG. 6d. Referring back to FIG. 6a, the clutch means 30 is encased by an airfoiled surface 4. The airfoiled surface 4 is shaped as a hollow conduit, having an upper side, a lower side, and opened to the wind flow defining an entrance 1, and an exit 2 operatively connected to the airfoiled surface 4. The airfoiled surface 4 is having a rectangular cross section perpendicular to the wind flow 5 and the axle vertical plane of symmetry as seen in FIG. 6b. It is understood that all parts of the generator armatures 40 are positioned symmetrically to the plane of symmetry, identifying the side facing the wind 5 as a front side, the opposite side of the vehicle positioned in the direction of the wind as a back side, the sides lying from both sides of the plane of symmetry as lateral sides, with the clutch means shaft rotating around the winding of the generator armature 40 as seen in FIG. 6c.

The vertical walls 49 seen in FIG. 6b are bent at vertical lines behind the clutch means 30 and diverged laterally outwardly symmetrically to each other on the same axle in the direction of the back side, at an angle of at least 15 degrees from the vertical plane of symmetry. An upper plate 100 is defined by the upper side of the airfoiled surface 4, and a lower plate 101 is connecting the vertical walls 49, encasing both lines of the clutch means 30. The plates 100 and 101 are configured with a front side 103, a back side 104 and two lateral sides 102 partially diverged laterally outwardly to the back side 104 to adapt the vertical walls 49. The upper plate 100 positioned at some distance from the hub 83 and the lower plate 101 positioned at some distance from the flow platform of the clutch means 30, providing an open space for an unobstructed wind flow 5. The horizontal distance between the front sides and the back sides of the plates 103, 104 defines the thickness/length of the plates. Both plates 100 and 101 consisting of a horizontal convergen parts, and the remaining part diverges backwardly at an angle between zero and 15 degrees at the bending line where plate 100 points upward and plate 101 points downward. The vertical distance between the front sides of the upper plate 100 and the lower plate 101 defines a height of the entrance 1 of the airfoiled surface 4, and the distance between the back sides of these plates defines a height of the exit 2 of the airfoiled surface 4.

The height of the exit 2 from the tunnel shaped chamber 48a through which air flows at a variable speed, generating aerodynamic properties is equal to the height of the entrance 1 where the angle of inclination of the upper plate 100 and the lower plate 101 are chosen approximating zero. The tunnel shaped chamber 48a through which air flows at a variable speed, generating aerodynamic properties is configured with the airfoiled surface 4 between the vertical walls 49 and the plates 100 and 101. The tunnel shaped chamber 48a comprises an entrance 1, located at the entrance of the airfoiled surface 4, depicted by the same number 1, are contracted in the vertical direction of the low middle part, define as a wind way to an exit 2. The entrance 1 to the tunnel shaped 48a also is characterized as a nozzle.

The exit 2 of the tunnel shaped chamber 48a through which air flows at a variable speed, generating aerodynamic properties is connected to the diffuser, configured with at least a plate. These plates are gradually diverging from each other and from the wind way, leaving narrow air gaps, and allowing the air to be pumped inside of the areas between the airfoiled surface 4 and the tunnel shaped chamber 48a by the rotating clutch means 30, and escaping through these gaps, creating an additional suction from the tunnel shaped chamber 48a through which air flows at a variable speed. The plates are adapted to connect the walls 49, partially diverged in the area of the exit 2. One of the plates is connected with the back side of the last of the guiding plates. Both back sides of the plates of the diffuser 57 and the diverged parts of the vertical walls 49 provide an enlarged area of the exit 2, gradually expanding in vertical and horizontal direction compared with the area of the entrance 1, which is expanding only in vertical direction. This enlargement of the area of exit 2 creates a zone of lower static air pressure, causing additional tunnel suction for the wind flow from the wind way.

In other embodiment of the invention, plate 104 is the lower pumping plate, positioned between the outer circles of the clutch means beneath the guiding walls 49. The lower pumping plates are having a front side. a back side, an upper surface, a lower surface and two lateral sides; these lateral sides, fixed to the vertical walls 49. The front sides are positioned below of the horizontal axis of rotation of the clutch means 30, and the back sides are positioned close to the back sides of the lower guiding walls 49. The lower pumping plates 104 direct the air 5, discharged from the blades 35 of the clutch means. The flow to the upper pumping plates is similar to the flow to the lower pumping plates. The upper pumping plates are enabled to direct the air, discharged from the blades of the clutch means 30 along the lower surface of the guiding walls 49. These pumping plates are configured to redistribute the air flow, pumped by the blades 35 of the rotating clutch means 30, in the space between the tunnel shaped chamber 48a through which air flows at a variable speed, and the airfoiled surface 4, increasing the efficiency of the clutch means.

The diffuser 57 is comprised of the diverged plates for directing the flow of the wind inside of the hub 83 and for controlling the perimeter of the extended zone of the exit 2. The outer surfaces of these plates are responsive for digressing the ambient wind streams, blowing along these outer surfaces above, below and along the lateral. In addition, the diffuser 57 is contracting these wind streams between the plate 100 and the hub 83 and between the plate 101 and the horizontal platform of the clutch means 30. The digressed and contracted wind streams are increasing speed and lowering the air pressure around the extending zone of the exit 2, providing additional tunnel suction for the tunnel shaped chamber 48a through which air flows at a variable speed, generating aerodynamic properties. All the mentioned plates and walls, the diffuser, airfoiled surface and the tunnel shaped chamber through which air flows at a variable speed, generating aerodynamic properties are made of durable, strong and rigid material, having less possible coefficient of friction with the wind flow.

A plurality of openings in the vertical walls 49 allows some of the air, pumped inside of the inner space of the airfoiled surface 4, to blow towards the electrical generator armature 30, providing cooling effect. At the entrance 1 of the tunnel shaped chamber 48a through which air flows at a variable speed, a lower deflecting plate 101 is seen covering the the flow of wind towards the clutch means 30. The generator armature 40 is configured with the clutch means. In one embodiment of the invention, the height of the air exit is larger than the height of the air entrance. The entrances 1 to the diffuser 57 are situated close to the front sides of the upper 100 and lower 101 plates.

Since the height of the air concourses 48 can be chosen equal for all the environments of the wheel 25, the generator armatures 40 is configured with the clutch means 530 and positioned in the lower line. The airfoiled surface 4 of the generator armature 40 consists of an ample space both in the vertical and the horizontal direction. The generator armature 40 is positioned at the rear of the clutch means configured with the diffuser 116.

In other embodiment of the present invention, the diffuser 57 comprised of a booster 57a configured with the clutch means 30 to provide an area of entrance 1 to the tunnel shaped chamber 48a and the area of exit 2. The booster 57a provides an additional fast flowing air to the entrance of the tunnel shaped chamber through which air flows at a variable speed, from the areas below and ahead of the entrance 1 and diminishing the turbulence of the wind in the entrance, at the same time lowering the static air pressure at the exit 2. The plates are configured for providing additional guiding surfaces for the air, flowing out of the exit 2, allowing the air to gradually expand and flying from the exit 2, lowering the static air pressure behind the tunnel shaped chamber 48a through which air flows at a variable speed and generating aerodynamic properties to create an additional tunnel suction for the wind way. The booster 57a further provides additional fast flowing air to the tunnel shaped chamber 48a from the area below and ahead of the airfoiled surface 4 and further lowering the static air pressure behind the tunnel shaped chamber 48a through which air flows at a variable speed, generating aerodynamic properties. The booster 57a, the airfoiled surface 4, the tunnel shaped chamber 48a, the diffuser 57, the guiding plates 101 and the pumping plates 100 are maid of a rigid, strong and durable material configured for the lowest possible coefficient of friction with the wind flow 5. The generator armature 40 is configured with the diffuser 57 and operatively connected to the booster 57a, partially encasing it with the airfoiled surface 4.

Referring to FIG. 7 depicts energy generating from a generator armature 40 configured with the clutch means 30 and operatively connected the booster 57a and/or the diffuser 57. The generator armature 40 is operatively configured so that when there is a voltage transition on the input winding, node B will approache positive relative to node A, while the voltage on node D increases relative to node C. The generator armature 40 comprising a small air gap phasing the outer circles of the clutch means 30, allowing a thin stream of wind 5 to flow unobstructed there between. The guiding plates 100 and 101 involve the frictional forces in the fast movement of the streams of wind 5 discharging from the vehicle 10 movement and the blades 35 of the clutch means 30, increasing the speed and the force of the wind 5 by striking on the blades 35 and the plates 100 and 101. The air gap 003 is received by diminishing the outer circle of the clutch means 30 and by increasing the distance between the lower line and the upper line of the said clutch means 30.

A partial cross-section of the clutch means 30 is seen in FIG. 6a showing passages where the wind flows through. The clutch means 30 has a cylindrical collar 004 configured with maximum radius for allowing rotating the clutch means around the axis 23 between the supports. Plates 100 and 101 are mounted on a vertical/horizontal platform of walls 49. The clutch means 30 is positioned slightly below the airfoiled surface 4 for diminishing friction as the wind 5 flow. The wheels 25 provide stability and security against the wind on the environment of the clutch means 30. The wind powered vehicle 10 is configured with a microprocessorized system communication means 70 operatively connected to a battery cell means 65 in communication with the capacitance means 60 configured with the generator armatures 40. The axle 20 and the clutch means are protected from snow, rain, vertically blowing wind and from sun. The vertical supports 49 are fixed to the axle 20 supporting the wheel 25. The horizontal plate 100 and 101 are secured to the vertical supports 49 connected to the axle. The sensor means 55 is circumferentially arranged around the axle 20 and configured with a capacitance means 60 in communication with the communication means 70.

Figure 8B:
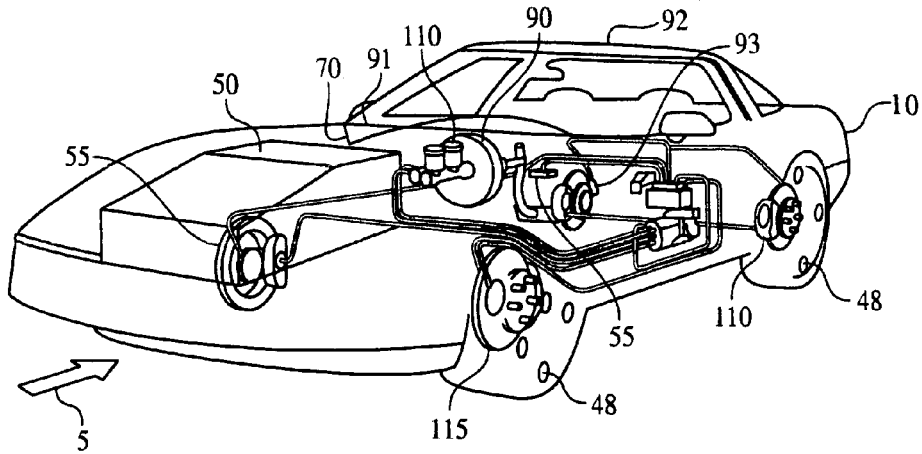
FIG. 8 is a vehicle and a cross-sectional view of another embodiment of the generator armature, having a clutch means, a booster, and a defuser.
Figure 8C:
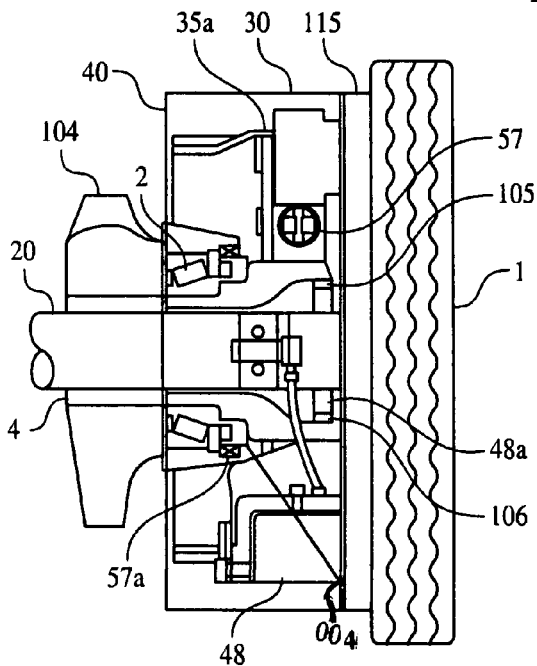
Figure 8A:
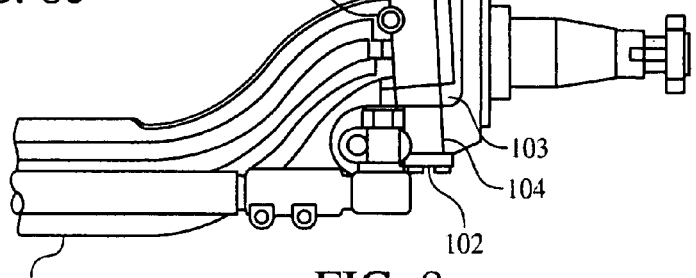

Referring to FIG. 8 is seen at least a sensor means 55 configured for the air concourses 48 and the temperature surrounding the braking means 110. The sensor means are spaced circumferentially around the vertical/horizontal axis of rotation of the brake rotor 115 and/or the brake drum "not shown" above the clutch means 30. Each sensor means is operatively connected to the communication means microprocessor 70 and indicates the energy position of the generator armature 40 towards the prevailing wind 5 as seen in FIG. 8b, enabling the microprocessor 70 to send initial command to the electric motor 50 for the vehicle 10. Referring to FIG. 8a, the plates 100 and 101 are configured to deflect wind blowing towards the stability conversions 23 to the air concourses 48. These splates are configured for connecting the flow of wind 5 towards the perimeters of the wheel 25 and within the perimeters of the axles 20, contracting the wind 5 entering into the air concourses 23, enabling the clutch means 30 to further increase the speed of the wind to advancing the efficiency of the flow. The solar panels 90 are mounted on the dashboard 91 or on the roof 92, and configured with antenna 93 extending outwardly. The plates are made of rigid, strong and durable material, having low coefficient of friction.

The generator armature 40 is configured with entrance 1 for the wind 5. The streams of the wind are contracted by the converging panels to a wind way, where the wind presses in the vertical direction and flows much faster than the speed of the ambient wind. At the exit 2, the gradually diverging plates allow the air, flowing out of the wind way, to gradually expand in the vertical and the horizontal directions at a volume, bigger than it had at the entrance 1, creating a zone of low static air pressure and a tunnel suction in the wind way, and further causing increase in the speed of the wind inside the wind way. Additional, enlarged zone of low static air pressure is provided by the diffuser 57. The low static air pressure is created by the air, captured by the narrow entrances above and below of the airfoiled surface 4, and gradually expanding inside of the air passages, while also flowing between the plates 100 and 101, and including the diverging plates to the outlet, below and behind of the exit 2. This low static air pressure creates permanent air suction inside of the tunnel shaped chamber 48a through which air flows at a variable speed, generating aerodynamic properties and an increased wind speed inside of the wind way 85. The possibility of a small whirl and turbulence at the entrance 1 and the exit 2 can occur only in the vertical direction and are reduced by the small angles of inclination of the panels and the divergent plates and diffuser configuration. The whirl at the entrance 1 is reduced by the slots 105 and 106, allowing some of the air streams to pass through and between the flat surfaces of the plates towards the blades of the clutch means 30.

The speed of the wind flowing along the wind way 85 is at least 8 times faster than the speed of the ambient wind, and in the embodiments of the present invention, configured with the booster 57a, this increases the wind speed to more than 12 times. At least one blade 35 of the clutch means 30 is protruding at any time in the wind way 85, and striking the wind on the front sides of the blades 35 causes a fast rotation of the clutch means 30. Most of the air trapped between the blades 35 is discharged back into the wind way 85 by the back sides of the blade 35a configured for less friction with the incoming air. In the embodiment depicted in FIG. 7, the generator armature comprises the primary input winding A and B, the additional balance winding C and D is configured for the electric motor 50 of the vehicle 10 and designed to oppose the electrostatic field generated by the input winding A and B. In other embodiment, the number of turns are selected such that the net electrostatic field from the combination of the balancing and input windings exactly matches that generated by the output winding. This achievement will enable a differential field between the primary and secondary circuits to approach zero and the displacement energy also to approach zero.

The blades 35 of the invention have a shape of a triangular prism, providing a possibility to generate energy with almost any reachable speed. Since there is only a small volume of air accumulated between the blades 35, the rotation of the clutch means 30 is smooth and quiet and creates fewer wind disturbances flowing in the wind way 85. Consequently, less air is pumped in the inner space between the airfoiled surface 4 and the tunnel shaped chamber 48a. The helically pitched blades are also an alternative, allowing very quiet and smooth rotation of the clutch means 30. These blades 35 allow continuous impact of the wind. The design of the helically pitched blade allows the wind discharged from the clutch means 30 to strike the adjacent blades at the right angle in a zigzagging way. Another embodiment of the clutch means 30 provides a smooth and quiet rotation. The shown clutch means 30 comprise several connected modules, and these modules are connected in such a way, that the blades are shifted by an angle from a center point, defined by the horizontal axis of rotation of the clutch means 30, rotating relative to the direction of the wind, so that the blades appear in the wind way at a different time and the wind is striking on the blades and discharges from the blades with smaller portions of air.

Referring now to FIG. 9 is seen vehicle 10 configured with solar panel 90, an antenna means 93, stability conversion 23, and the direction of wind 5 flowing relative to the direction of vehicle 10. FIG. 9a is seen a configuration of the tire 25, upperwheel rim 26, lowerwheel rim 27, and a flow chamber 85. Referring to FIG. 9b is seen an expanded view of the hub 83 configured with the air concourse 48, the tunnel shaped chamber 48a, the entrance 1, the slots 105 and 106, and the equal angles. Referring to FIG. 9c is seen another embodiment of the present invention, comprising a transmission means 200 configured to transmit motion to a clutch means 30, configured with blades 35, generator armature 40, and a wire harness 44. Referring to FIG. 9d is seen an extracting view of two meshing gears 210 and 220. Gear 210 operatively connected to the driveshaft and gear 220 is operatively connected to the clutch means 30.

As previously stated, the booster 57a responsive for increasing the contraction ratio for the flow of wind 5 in the tunnel shaped chamber 48a, and for diminishing the possibility of small whirl and turbulence at the entrance 1 and at the exit 2 of the tunnel shaped chamber. The booster 57a further lowers the static air pressure at the exit 2 of the tunnel shaped chamber. The generator armatures 30 is configured with the booster 57a and the diffuser 57, both creating a large combined zone of low static air pressure at the exit 2 of the tunnel shaped chamber 48a, providing more tunnel suction, and greatly increasing the smallest wind at the entrance 1. The increased contraction of the wind 5 at the entrance 1 of the tunnel shaped chamber 48a and the increased suction of the air at the exit 2 provide a possibility to position this generator armature 30 on any chosen vehicle 10.

The operation of this wind powered vehicle is completely microprocessorized and controlled by the microprocessor 70. The microprocessor 70 comparing the time between the signals from the sensor means 55 for the powered vehicle, and when the time is becoming close for the generator armature 30 to be enabled, the microprocessor 70 communicates that signal. The microprocessor 70 is connected with to battery cell 65 means and the capacitance means 60 responsive for transferring of the electrical energy. The microprocessor 70 is constantly in communication with, and monitoring the energy of the electric motor in communication with the capacitance means 60 and the generator armatures 30.

The capacitor comprises of a class of ultra-capacitors can store enough energy and deliver enough power to be useful in advanced automotive applications. With the demand for more luxuries in basic automobiles, the ultra-capacitors with its' power density as well as long life cycle, provides a complete solution to the increasing power needs found in the automotive industry.

The capabilities of ultra-capacitors for efficient electrical energy storage and rapid discharge/recharge are integral to energy development programs for low-emission, fuel-efficient, hybrid power-trains and advanced electrical drive systems. By supplementing the primary engine with an electric motor that assists initial acceleration, and recaptures and reuses braking energy, wind energy, and the energy from the rotational torque of the axle, fuel consumption can be reduced by more than 60 percent, particulate emissions by 90 percent, and nitrogen oxide emissions by 50.

In other embodiment of the invention, the solar panels 90 and the plates 100 and 101 are deflecting the wind 5 from the stability conversions 23 towards the air concourses 48, gradually contracting the wind 5 flowing towards the air concourses 48, and gradually expanding the wind 5 flowing out of the air concourses 48, there by increasing the wind speed inside of the air concourses 48 and the efficiency of the clutch means 30. The solar panels 90, mounted on the dashboard panel 91 and/or on the axle support, providing additional electrical power to the wind flow. The disclosed features of the present invention are configured to intercept most of the energy of the wind, blowing towards the whole area of the front side of the wheel 25.

The present invention more specifically relates to the wind power generator that produces high output power of electricity by increasing wind flow speed to empower vehicle batteries and/or an electric motor for a vehicle 10. Wind power generator 30, which utilize a natural wind flow 5, sometimes fail to produce sufficient wind power depending on the state of the vehicle 10. Therefore, it is suggested that by employing some means to generate sufficient power, wind flow 5 is accelerated to expedite the generation of energy to energize electric motors 50 for vehicles 10 and/or vehicle battery cell means 65. The present invention provides a wind speed-up device capable of efficiently increasing wind flow speed with a simple structure to enable automotive fuel independence and/or to generate electric energy effectively and efficiently.

Figure 10A:
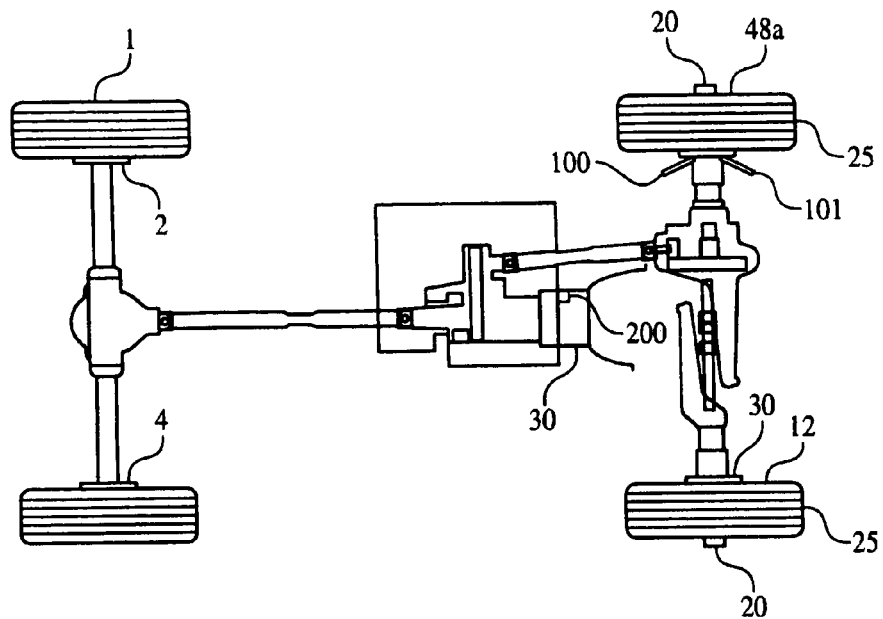
FIG. 10 depicts different configuration of the embodiment of the invention, a section of the embodiment is a generator armature, similar to shown in FIG. 9, but configured with a bigger air gap in vertical direction between the clutch means and the transmission or axle means.

Referring to FIG. 10a is seen an extention of the wind speed-up device 57 and 57a operatively connected to a tunnel shaped chamber 48a having a cylindrical shape and expanding from the air entrance 1 towards an exit 2 through which wind flows. The entrance 1 of the tunnel shaped chamber 48a comprises an airfoiled surface 4 which is opened outwardly with a curved surface. An opening of the exit 2 is configured with a collar-shaped flange 12 that outwardly expands. An area adjacent to the entrance 1 is adopted for outputting the generated wind power, which is then converted into electrical energy. The structure of the present invention provides wind around the axis of the tunnel shaped chamber 48a, flowing in from the front of the entrance 1, and pulls in slow wind flowing along an inner wall surface 25a of the tunnel shaped chamber 48a towards the rear side of the exit 2, thereby obtaining a high-speed wind area adjacent to the entrance 1. Thus, another object of the present invention is to provide a wind power generator having a wind wheel axle rotating with the wheel 25, and configured with a tunnel shaped chamber through which air flows at a variable speed, generating aerodynamic properties, which generates high output power by efficiently increasing wind flow speed.

Figure 10B:
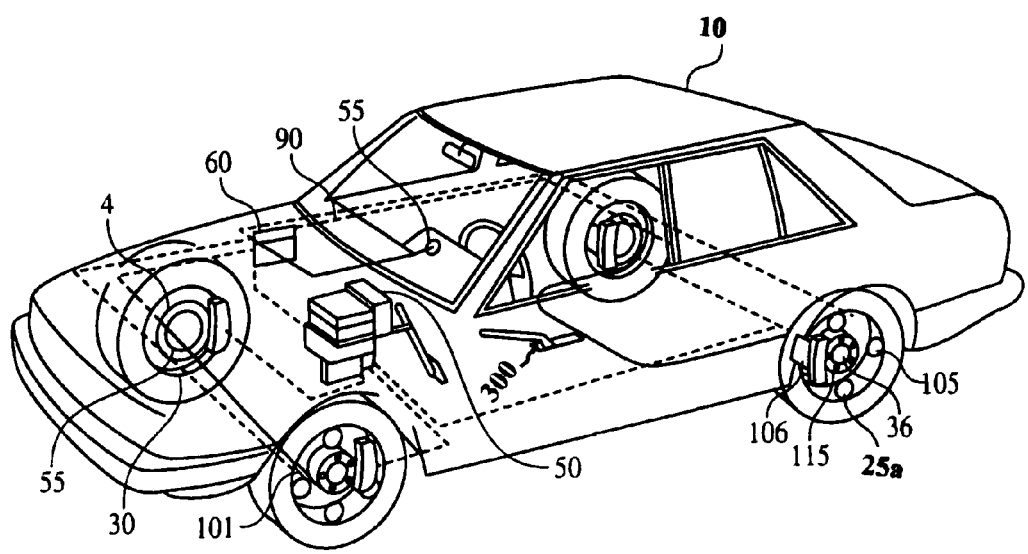

Referring to FIG. 10 is seen the generator armature 30 of the present invention responsive for generating power, disposed at a position adjacent to the inlet of the tunnel shaped chamber 48a. The resistance by the wind against the wheel 25 prevents separation of a wind flow on an inner wall surface of the tunnel shaped chamber, even if an angle of inclination of a side wall portion against an axis is increased to more than 6 degrees. Since rotation of the wheel 25 and the clutch means 30 accelerates the flow rate of wind 5 in a radial direction of the tunnel shaped chamber, the wind flow on the inner wall surface of the tunnel shaped chamber 48a is further prevented from separating, and wind flowing in from the entrance 1 of the tunnel shaped chamber 48a is smoothly flown along the inner wall surface towards the exit 2. Therefore, even if the angle of inclination of the side wall portion is increased at the maximum degree, separation of the wind flow on the inner wall surface of the tunnel shaped chamber is prevented until the wind flow reaches the exit 2.

The wind 5 is fed from the entrance 1 of the tunnel shaped chamber 48a, and flows smoothly along the inner wall surface to the exit 2 without causing separation of wind. Therefore, the wind flow is made to have negative pressure around the entrance 1 of the tunnel shaped chamber 48a, and recovers pressure without a great flow loss until reaching the exit 2, thereby efficiently accelerating wind velocity to generate high output power that is transformed into electrical energy. In other embodiment of the present invention, a horizontally mounted shaft 36 turns the clutch means 30, which provides input to its configured gear box which increase a rotation speed and turns the generator armature 40 that converts the shaft power into electrical power.

In another object of the present invention, the entrance 1 to the tunnel shaped chamber 48a is preferably a curved and/or rectangular surface which smoothly expands toward an outside of the tunnel shaped chamber. Any of these structures enables wind in the proximity of the front of the entrance of the tunnel shaped chamber and is smoothly be fed, enabling the flow rate of the fed wind to increase in a radial direction by rotation of the clutch means 30 configured with means for generating electrical energy. Said means is disposed adjacent to the entrance. Accordingly, separation of wind from the inner wall surface of the tunnel shaped chamber around the entrance is further prevented.

The further object of the present invention is to more efficiently realizing an area of high-speed wind to generate high output electrical energy for a vehicle 10. The energy can be transferred to the existing acid batteries, lithium batteries, and special battery cells that would expedite the development of fuel-independence electric vehicles that would not need to be plugged. It is another object of the invention, by combination of a clutch means having aerodynamic features and mechanical means, to increase the efficiency of electric vehicles energy system, forming an adequate speed/acceleration control system for the vehicle 10. The clutch means configuration with the wheel is useful for generating electrical energy. The electrical generator armature 30 responsive for converting the energy absorbed from the wind into electrical energy is operatively connected to the vehicle's axle structure.

It is further an object of this invention to provide a wind energy system having clutch means 30 configured with support frames to basically presents a wind energy vehicle, where at least a portion of the kinetic energy possessed by the wind is converted into mechanical energy comprising tangential flow to the clutch means 30 responsive for rotation around the axis of the wheel. Each clutch means 30 having the form of a hollow prism in wind-direction, a curved surfaces configured with a shaft mounted on an axle structures fitted into support frames, and arranged symmetrically at the axle structural assemblies. Wind-deflecting plates 100 and 101 arranged and attached rigidly to the support frames. The wind-deflecting plate 100 and 101 are curved convexly against the wind-direction and further extends symmetrically along the same structure configured for the rotation circles of the clutch means 30. The structure comprising guide surfaces where the airflow are formed, which are moderately inclined against the wind-direction, directing a tangential airflow over the curved surfaces of the clutch means 30, while also shielding segments rotating against the wind-direction. The tangential airflow enables achieving optimum clutch means 30 efficiency, generating maximum airflow in directional/relative motion through which the force there between is converted into electric energy.

To increase further the efficiency of the tangential airflow through the clutch means 30 without essentially changing the compact and robust structure of the prism-form, slots 105 and 106 are arranged in each of the clutch means surfaces and curved in wind-direction first convexly, then concavely. A cross-section polygon with at least a corner of the convexly curved part of the polygon line extending from the leading corner approximately to at least a distance with a straight line between two adjacent corners. The concavely curved part extending from the trailing corner only at a distance in the corresponding clutch means 30 surface. At least a slot 105 is positioned just behind the convexly curved surface part. The slots 105 and 106 allow a limited airflow to pass through the wheel 25 having a passage to the central part of the clutch means 30. The clutch means 30 comprises a rotatable structure operatively connected to axle/spindle means configured with a support frame 49 and at least a plate 100.

All the embodiments of the present invention are to be considered in all respects as illustrative and not restrictive; the scope of the invention being indicated by the appended claims rather than by the foregoing description. All changes which come within the meaning and range of equivalency of the claims are intended to be embraced therein. Variety of changes can be made without departure from the essence and the scope of the present invention. Various elements of the invention and the claims may be achieved in a variety of ways. it is therefore understood, that the broadest scope of this invention includes such modifications as diverse shapes, sizes, positional parts, materials and combination of elements. Such scope is limited only by the claims as read in connection with the above specification. Many other advantages of the present invention are apparent from the description of the specification and the claims.

I claim:

1. A renewable energy vehicle comprising a regenerative energy system disposed on a vehicle axle with which a wheel assembly revolves, said system comprising:
   (a) a housing disposed on said axle, said housing being configured to receive an airflow through an opening;
   (b) an apparatus for deflecting aerodynamic force disposed on said housing;
   (c) an apparatus disposed in said housing for converting one type of energy to another type of energy; said apparatus comprising an electrical generator in fluid communication with said opening and responsive to at least a wheel rotation;

(d) wherein said housing is coupled with said wheel assembly and comprises a mounting structure to engage said electrical generator assembly with said axle structure;

(e) wherein both the rotation of said wheel assembly and the airflow received through said opening form a propellant for said generator.

2. The renewable energy vehicle of claim 1, wherein said electrical generator is coupled to a turbine assembly located in said housing in fluid communication with said opening through at least an inlet channel.

3. The renewable energy vehicle of claim 2, wherein said turbine assembly is coupled to said electrical generator on said axle, said system further comprising a clutch.

4. The renewable energy vehicle of claim 1, wherein said housing further comprises an inlet channel comprising an entrance and an exit through which kinetic energy is converted into another form of energy.

5. The renewable energy vehicle of claim 4, wherein airflow through said inlet channel enables said turbine assembly to be propelled both with and without said wheel assembly rotation.

6. The renewable energy vehicle of claim 3, wherein said clutch enables freewheeling of said turbine assembly through a central axis of said wheel assembly rotation.

7. The renewable energy vehicle of claim 1, wherein said housing comprises a turbine housing portion, a turbine assembly being located in said turbine housing portion, and an inlet channel being configured to increase the velocity of said airflow to said turbine housing portion, wherein said turbine assembly is responsive to said wheel assembly rotation and said velocity of airflow for generating electrical energy.

8. The renewable energy vehicle of claim 7, wherein said axle structure is configured for rotating said turbine assembly and said electrical generator.

9. The renewable energy vehicle of claim 8, wherein said assembly is configured to convert the rotational torque from said wheel assembly and said airflow force into electrical energy.

10. The renewable energy vehicle of claim 1, wherein said opening further comprises an airflow guide formed integrally with the axle structure of a vehicle.

11. The renewable energy vehicle of claim 10, wherein said airflow guide further comprises a turbine assembly, said generator assembly responsive to said turbine assembly for generating electrical energy and wherein said generator is in communication with at least a battery cell.

12. The renewable energy vehicle of claim 11, wherein said generator assembly in further communication with at least a capacitor.

13. The renewable energy vehicle of claim 12, wherein said capacitor further comprises apparatus for storing electrical energy, said apparatus communicatively connected to said battery cell for releasing at least electrical energy when required.

14. The renewable energy vehicle of claim 12, wherein said capacitor is operatively configured with a communication device for controlling the energy for vehicle accessories and communication with said battery cell.

15. The renewable energy vehicle of claim 2, wherein said generator assembly further connected to a communication device comprising an electrical regulator, said communication device being electrically connected to one or both of a capacitor and a battery cell.

16. The renewable energy vehicle of claim 1, wherein said system is further configured for converting heat energy due to frictional force caused by braking and rotational torques into electrical energy.

17. The renewable energy vehicle of claim 1, further comprising a solar panel configured with a solar cell responsive to photovoltaic energy, said panel in communication with a capacitor for energizing at a battery cell.

* * * * *